Figure 1:
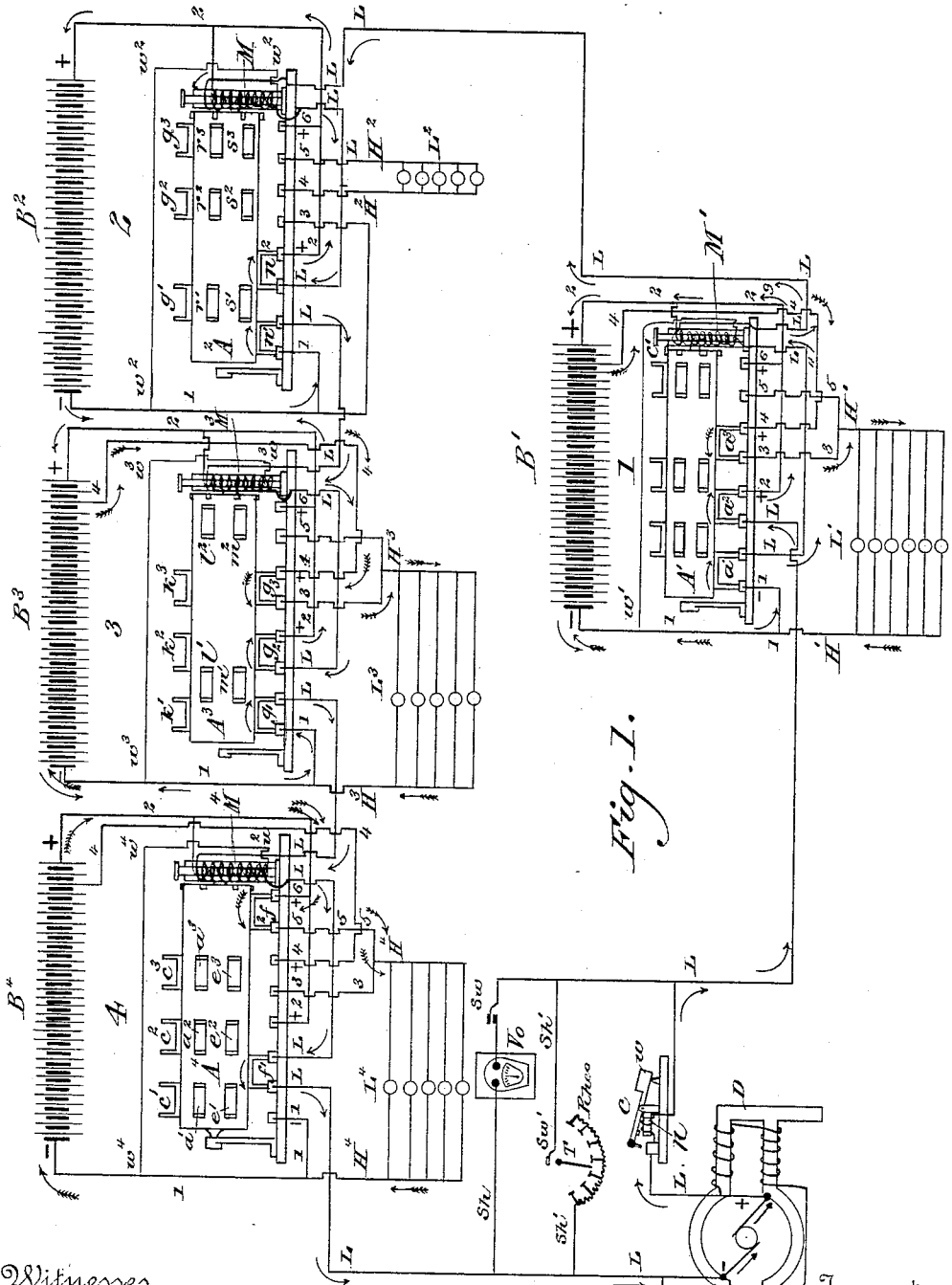

(No Model.) 2 Sheets—Sheet 1.

M. PFATISCHER.
APPARATUS FOR CHARGING AND DISCHARGING SECONDARY BATTERIES.

No. 387,988. Patented Aug. 14, 1888.

Witnesses.
A. P. Jennings.
L. Douville.

Inventor.
Mathias Pfatischer
by Diederoheim & Kintner
attys.

(No Model.) 2 Sheets—Sheet 2.
M. PFATISCHER.
APPARATUS FOR CHARGING AND DISCHARGING SECONDARY BATTERIES.
No. 387,988. Patented Aug. 14, 1888.
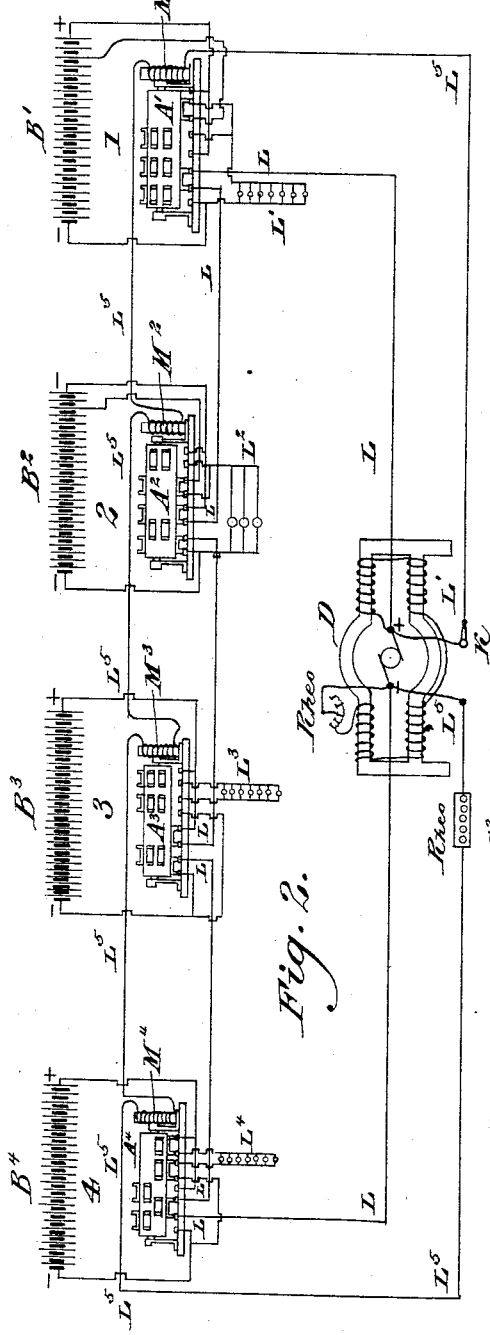
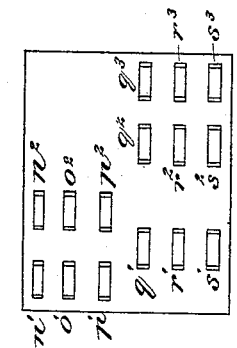
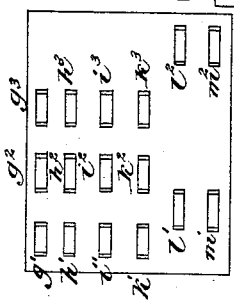
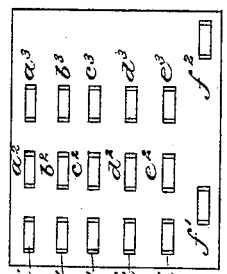
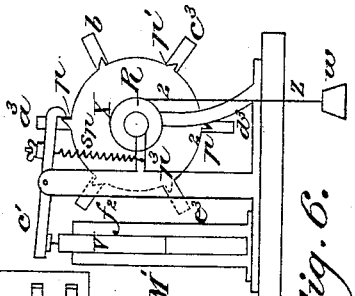
Witnesses,
A. P. Jennings
L. Douville
Inventor,
Mathias Pfatischer,
by Hadersheim & Kintner
Atty's.

UNITED STATES PATENT OFFICE.

MATHIAS PFATISCHER, OF PHILADELPHIA, PENNSYLVANIA, ASSIGNOR OF ONE-HALF TO WILLIAM T. BROWN AND WILLIAM KIRK, JR., BOTH OF SAME PLACE.

APPARATUS FOR CHARGING AND DISCHARGING SECONDARY BATTERIES.

SPECIFICATION forming part of Letters Patent No. 387,988, dated August 14, 1888.

Application filed November 18, 1887. Serial No. 255,465. (No model.)

*To all whom it may concern:*

Be it known that I, MATHIAS PFATISCHER, a subject of the Emperor of Germany, having resided in the United States one year last past and declared my intention of becoming a citizen thereof, and residing in the city and county of Philadelphia, State of Pennsylvania, have invented a new and useful Improvement in Apparatus for Charging and Discharging Secondary Batteries, which improvement is fully set forth in the following specification and accompanying drawings.

My invention relates to improvements in apparatus for charging and discharging secondary batteries; and to this end it consists in a system or apparatus for controlling the charge or discharge of one or more such outlying batteries located at consumption-stations, the operation of the entire apparatus being under the control of a person located at the central or supply station, and the arrangement being such that said person at the central station may connect or disconnect any particular battery to the charging-dynamo, the lamps, or both, or cut it entirely out at pleasure.

It also relates to details of construction hereinafter described, and particularly pointed out in the claims which follow this specification.

Prior to my invention it was old in the art to cut in or out a whole series of secondary batteries located at outlying stations simultaneously, so as to charge or discharge such series of batteries at pleasure, and such action was accomplished from the central station by apparatus under control of an operator located there; but I am not aware that any one prior to my invention has devised apparatus for manipulating the operation of each independent battery at will.

A better understanding of my invention will be had by referring to the drawings accompanying this specification, in which—

Figure 1 is a diagrammatic view of my improved apparatus, showing every feature in detail. Fig. 2 is a similar view of a modified form controlled by an independent line, as will be explained. Figs. 3, 4, and 5 are plan views of the circuit-changing drum or cylinder, developed or unrolled, and showing the several contact makers or loops for the varying conditions or operations. Fig. 6 is an end view of one of these cylinders, showing the controlling-magnet and the step-by-step mechanism by which it is allowed to rotate.

Similar letters of reference indicate corresponding parts in the several figures.

Referring to the drawings, D is the charging-dynamo, of any well-known construction, connected to leads or mains L L, leading to and through the apparatus in the several outlying stations 1, 2, 3, and 4.

$B'$, $B^2$, $B^3$, and $B^4$ are the secondary or storage batteries to be charged or discharged, and $L'$ $L^2$ $L^3$ $L^4$ the lamps, of usual pattern, connected to and disconnected from the respective battery-circuits as desired, as will be described.

$A'$ $A^2$ $A^3$ $A^4$ are cylinders or drums, of insulating material, journaled on supports at either end, as shown, and each having a step-by-step ratchet or wheel, R, and a pulley, X, with a weight, W, sustained by a cord, $z$. (See Fig. 6.) These drums may be retarded by any desired retarding mechanism to prevent rapid rotation on release of the ratchets $pp'$, &c., by the pawl on levers $c'$, attached to the solenoid cores V of magnets or solenoids $M'$ $M^2$ $M^3$ $M^4$. On the drums are affixed a series of metallic loops, $a'$ $a^2$ $a^3$, &c., for making circuit through the mercury-cups (eight in number) for each drum, as shown on the base-boards. These loops are arranged in different order on the cylinders located at successive sections, so that as the cylinders are rotated together by the releasing action of the ratchet and pawl, Fig. 6, the batteries and lights at such stations are placed in varying relations. There are six sets of these loops shown on each cylinder, as will be understood by examining the station apparatus of Fig. 1, in connection with the developed views of the cylinders in Figs. 3, 4, and 5. In Fig. 3 the sets, ranging from $a'$ $a^3$ to $e'$ $e^3$, are adapted to connect the generator, the batteries, and the lights all in circuit at one time, as shown at station 1, and the loops $f'f^2$ are adapted, as shown at station 4, to keep the charging-generator circuit closed around the battery, while it (the battery) is closed through the lights. The first cylinder shown in Fig.

3, box-station 1, has four sets of charging-loops, $a'$ to $e'$, &c., inclusive, and one set of discharging and shunting loops, $f'f^2$. The next cylinder for station 2 (shown in Fig. 4) has three sets of charging-loops, $g'$ to $k'$, &c., inclusive, and two sets of discharging and shunting loops, $l'$ $l^2$ $m'$ $m^2$. So, in succession, the station-cylinders have a diminished number of charging-loops and an increased number of discharging and shunting loops, so that with six stations the last cylinder would have one set of charging-loops and six sets of discharging and shunting loops, being the reverse of that shown in Fig. 3. As the cylinders are rotated step by step, the charging-current is shunted around the storage-batteries and the lights cut in.

Fig. 5 shows a modified arrangement of the contact-loops, in which $n'$ $n^2$ to $p'$ $p^2$ conduct the charging-current through the battery, while the lights are wholly detached, and $q'$ $q^2$ $q^3$ cut out the charging-generator and throw in the lamps. With this form the lamps are wholly out of circuit while the battery is being charged, and when the lamps are on, the generator is shunted, while it will be noted that with the form shown in Figs. 3 and 4 the lights are always on circuit with either the secondary or both it and the charging-generator.

$w'$ $w'$ $w^2$ $w^2$ $w^3$ $w^3$ $w^4$ $w^4$ are shunts, of fine wire and comparatively high resistance, each always closed about its particular battery and through the solenoid or magnet $M'$, $M^2$, $M^3$, or $M^4$. The function of these shunts is to give to the cores of the solenoids $M'$ $M^2$ $M^3$ $M^4$ a permanent magnetism of a given polarity, but insufficient under ordinary circumstances to overcome the power of the retractile spring $sp$, Fig. 6, except as hereinafter explained.

When all of the batteries are being charged, the leads L pass successively around a coarse-wire coil of low resistance to each solenoid $M'$ $M^2$ $M^3$ $M^4$, but in a direction such that a current from the dynamo opposes the action of the current due to the batteries through the fine-wire coils of the shunts. This action neutralizes the action, therefore, of said coils. In other words, the solenoids are differentially wound, one set of windings being of coarse wire of low resistance wound in series in the main, and the other or differential windings being in the local or battery circuits.

$Sh$ and $Sh'$ are two normally-open shunts about the dynamo-machine, one containing a voltmeter, Vo, and switch or key $Sw$, and the other a rheostat, Rheo, with arm T and switch $Sw'$.

Rheo is a rheostat, of usual form, for regulating the field of the dynamo.

C is an automatic electro-magnetic cut-out, of well-known form, in which the current from the generator D, when charging the batteries, passes by wire L through the front contact of the weighted armature-line $w$, and thence by the convolutions of the magnet to line. This holds the armature down so long as the current flows; but should the batteries by back-flow demagnetize the magnet the weighted armature $w$ falls and breaks the circuit, thus preventing a renewal of the magnetic field of the dynamo, in a manner well understood.

The operation is as follows: Supposing the generator to be set in motion and the cut-out closed. A current of electricity is set up in the main or lead, as shown by the tailless arrows, as follows: from the plus-brush by main L, through magnetic cut-out C, main L to station 1, through loop $a^2$ on drum $A'$ and mercury-cups by main L through the battery B, and by wire 1 to loop $a'$ on drum $A'$, solenoid $M'$, and mercury-cups to main L and station 2 through solenoid $M^2$, main L, loops $a^2$ on drum $A^2$, mercury-cups and wire 2 through battery $B^2$, wire 1, loop $n'$, main L to station 3, solenoid $M^3$, main L, loops $g^2$ on drum $A^3$, mercury-cups, wire 2, battery $B^3$, wire 1, loop $g'$ on drum $A^3$, mercury-cups and main L to station 4, solenoid $M^4$, main L, loop $f'$ on drum $A^4$, main L, mercury-cups, and finally by main L to the minus-brush of the machine. It will be thus seen that the batteries $B'$, $B^2$, and $B^3$ are being charged while $B^4$ is disconnected from the dynamo and mains and is discharging through the house-mains and lamps $L^4$, as shown by the tailed arrows, as follows: from the plus-pole by wire 2 to branch wire 6, loop $f^2$ on drum $A^4$, mercury-cups and wire 5 to lamps $L^4$, wire 1 to minus-pole of battery.

During the process of charging secondary batteries, while the lamps on the house-mains are in circuit, it is found that when there is a sufficient voltage on the battery to charge it, and at the same time there is sufficient electro-motive force in the battery to glow the lamps to proper candle-power, there is danger, as the battery nears the maximum charging-point, of injury to the lamp, inasmuch as the lamps are taking the full charge of the battery with the overflow from the dynamo. To avoid this objection, I connect a loop or shunt wire, 4, at some intermediate portion of the battery with one of the sets of mercury-cups, so that while the whole battery is being charged only a major portion of it is discharging, leaving out sufficient number of cells from the light-circuit to avoid the danger referred to. Such a description of circuits is shown at station 1, in which the battery $B'$ is being charged while the house-circuits are taking their current from the battery and the overflow. On tracing the discharge-circuits from the batteries through the lights at stations 1 and 3, as shown by the tailed arrows, it will be seen that the lamps are in circuit with only the major portion of their respective batteries. At station 2 the house-mains are cut out entirely, and at the mercury-cups connected to wires 4 and 5, and the battery $B^2$ is taking the entire charge.

So far I have described the operation based upon the supposition of a closure of the circuit at the cut-out C, with the dynamo D in operation. Suppose, now, it is desired to change the condition of affairs at any or all of the outlying stations. Close the key Sw and read the voltage on the voltmeter Vo. This will give the electrical condition of the external circuit. Then stop the dynamos or break the circuit at cut-out C, and place arm T on the proper resistance of Rheo to give a sufficient backflow from any battery in circuit through the coils of solenoids M' to M⁴ of each solenoid, and thus energize the core sufficiently to release the ratchet and allow the drum or drums to rotate. Each closure of the circuit at Sw' will cause all the drums to advance one step, and the attendant can thus cut in or out any desired battery or place the drums in any desired position by observing the position of his own drum and manipulating as desired. Of course it will be understood that there should always be sufficient charge in some one of the batteries to give this backflow, preferably the home or main station battery. Under ordinary circumstances it is supposed that none of the batteries will be suffered to totally discharge.

In the event of any radical trouble at any station the cylinder or drum at that station might be rotated by hand until placed in the position shown at station 3, so that the current from the charging-dynamos would pass by the station.

An examination of the developed drums, Figs. 3, 4, and 5, shows that each station will be thrown out in succession as they are all rotated, so that each battery is cut entirely out of the charging-circuit once in each complete revolution and the lamps cut in; also, that the house mains are absolutely broken at one point at each revolution, and that in several positions both battery and lights are in circuit. With such an arrangement I am enabled to place the lights and batteries under the absolute control of the central or charging station operator.

In the modified form shown in Fig. 2 I utilize an independent circuit, L⁵, running from the dynamo D to and through all of the magnets or solenoids M' to M⁵, and take off a branch circuit from the dynamo by closing the key K. In this way I cause all the drums to be actuated step by step, as desired. I regard this form as the full equivalent of the form shown in Fig. 1.

Of course it will be necessary that the step-by-step apparatus which controls the rotation of the drums should be accurate; and to this end I may use any desired apparatus, such as shown or as is used in printing dial-telegraphs, such being a mere matter of selection of mechanism well known to subserve the ends sought.

I am aware that secondary batteries have been provided with apparatus for charging them, having switching mechanism controlled by drums, and that it is not new with me to cut such batteries into and out of the circuit of a charging-generator by means of electro-magnets located in an independent circuit, and I do not claim such features, broadly. I do not limit myself, however, to the specific mechanism shown, as it is obvious the same effects might be had by mechanism not substantially different.

Having thus described my invention, what I claim as new, and desire to secure by Letters Patent, is—

1. In a system for charging and discharging secondary batteries, the combination of a charging-generator having leads running to two or more independent stations with circuit-controlling apparatus at each station under the control of an operator at the charging-station, said circuit-controlling apparatus consisting of rotatable cylinders having electrical contacts for cutting the batteries into the charging-circuit and additional contacts for cutting the lamps into the battery-circuit, substantially as described.

2. In a system for charging and discharging two or more secondary batteries, the combination of a charging-generator having mains leading to the batteries at outlying stations, with means at each station for cutting out the batteries in any desired order, and lamps or other translating devices in loop-circuits having connections for cutting them into the battery-circuits, substantially as described.

3. In an apparatus for charging and discharging secondary batteries, the combination of two or more switch-drums having electrical contacts arranged in a prearranged order, and means, as described, for rotating said drums together, substantially as described.

4. In an apparatus for charging and discharging secondary batteries, the combination of switch mechanism for cutting the battery into the charging-circuit with shunts for cutting out a portion of the battery during the process of charging, substantially as described.

5. In an apparatus for charging and discharging secondary batteries, the combination of two or more circuit-changing drums having circuit-making contacts for connecting the charging-generator or the lamps to the batteries at pleasure with electro-magnets or solenoids, one for each drum, said magnets or solenoids being in circuit with the charging-generator and adapted to control the rotation of the drums, substantially as described.

6. In an apparatus for charging and discharging secondary batteries, the combination of a charging-generator having two shunts about its poles, one containing a variable resistance and the other a voltmeter, with one or more secondary batteries located at outlying stations, each having a circuit-changing device adapted to cut out the charging-generator and to cut in the lamps on insertion of the proper resistance in the first-named shunt, substantially as described.

7. In an apparatus for charging and discharging secondary batteries, the combination of the following elements: a charging-generator having two normally-open shunts about its poles, leads or mains running to one or more outlying points having secondary batteries to be charged, lamps or other translating devices to be supplied with electricity, switch mechanism consisting of a rotatable cylinder or cylinders carrying contacts adapted to cut in the battery or batteries and lamps at will, and electro-magnets or solenoids located in the main circuit, substantially as described.

8. In an apparatus for charging and discharging secondary batteries, the combination of a charging-generator having mains leading to one or more outlying stations containing secondary batteries and lamps or other translating devices, with a switch mechanism at each station for cutting in the batteries or lamps at will, and a differential solenoid or electro-magnet having one differential branch in the charging-circuit and the other in a normally-closed shunt through the batteries, substantially as described.

9. A switch for controlling the relation of a charging-generator, a secondary battery, and a consumption-circuit, consisting of a series of contacts arranged on a variable surface, one set for connecting and disconnecting the charging generator to the battery, another set for connecting and disconnecting lamps, and a third set for connecting both the charging-generator and the battery to the lamps or translating devices, substantially as described.

10. A switch for controlling the relation of a charging-generator, a secondary battery, and a consumption circuit, consisting of movable contacts arranged to connect the secondary battery and the consumption-circuit in circuit with the charging-generator, with an additional set of contacts for cutting out part of the battery during the process of charging, substantially as described.

MATHIAS PFATISCHER.

Witnesses:
JOHN A. WIEDERSHEIM,
A. P. JENNINGS.